Oct. 26, 1926.  1,604,491
J. W. SHUMATE
TRAP FOR MICE AND RATS
Filed March 6, 1925   2 Sheets-Sheet 1
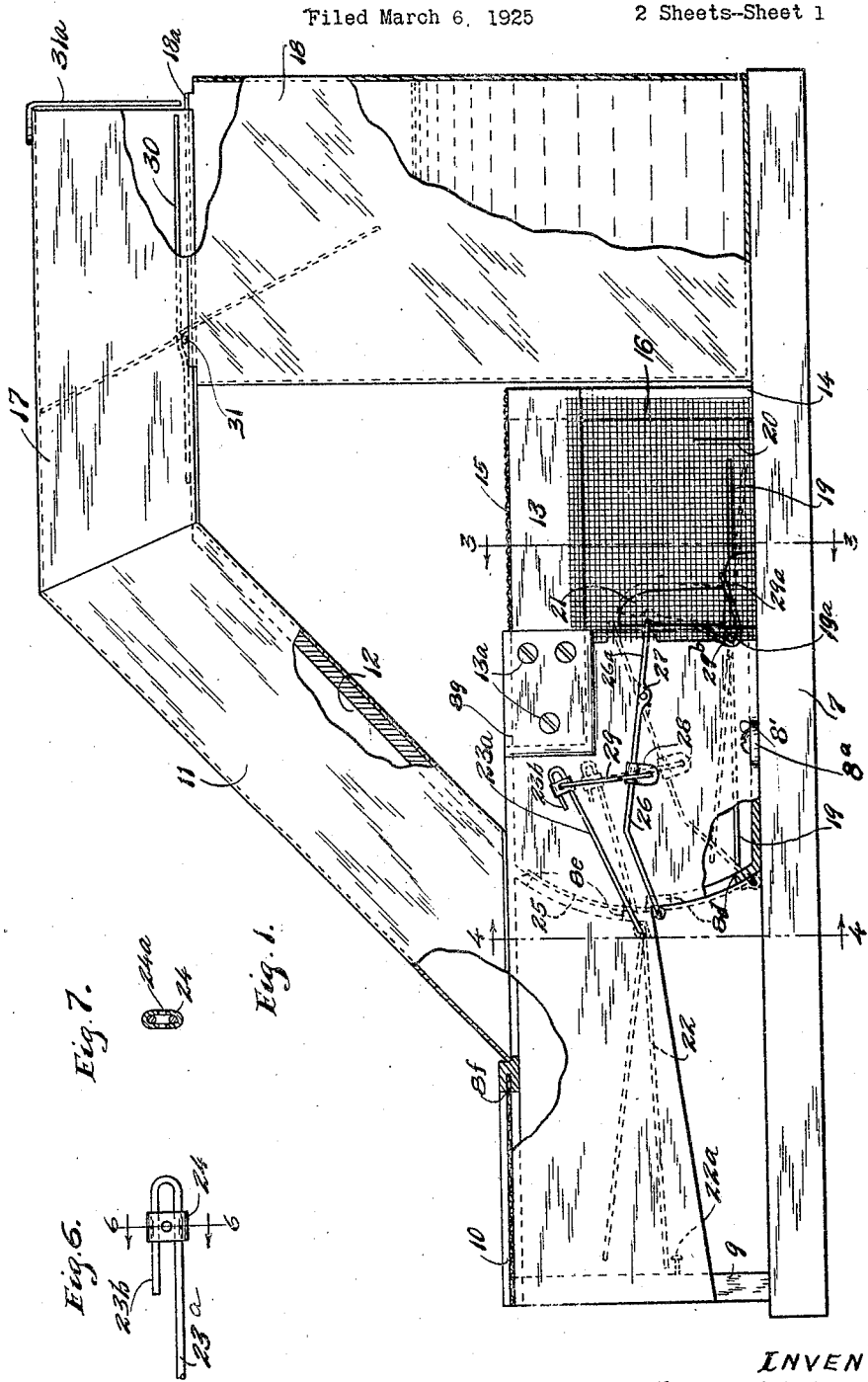
INVENTOR.
JOSEPH W. SHUMATE.
BY HIS ATTORNEYS.

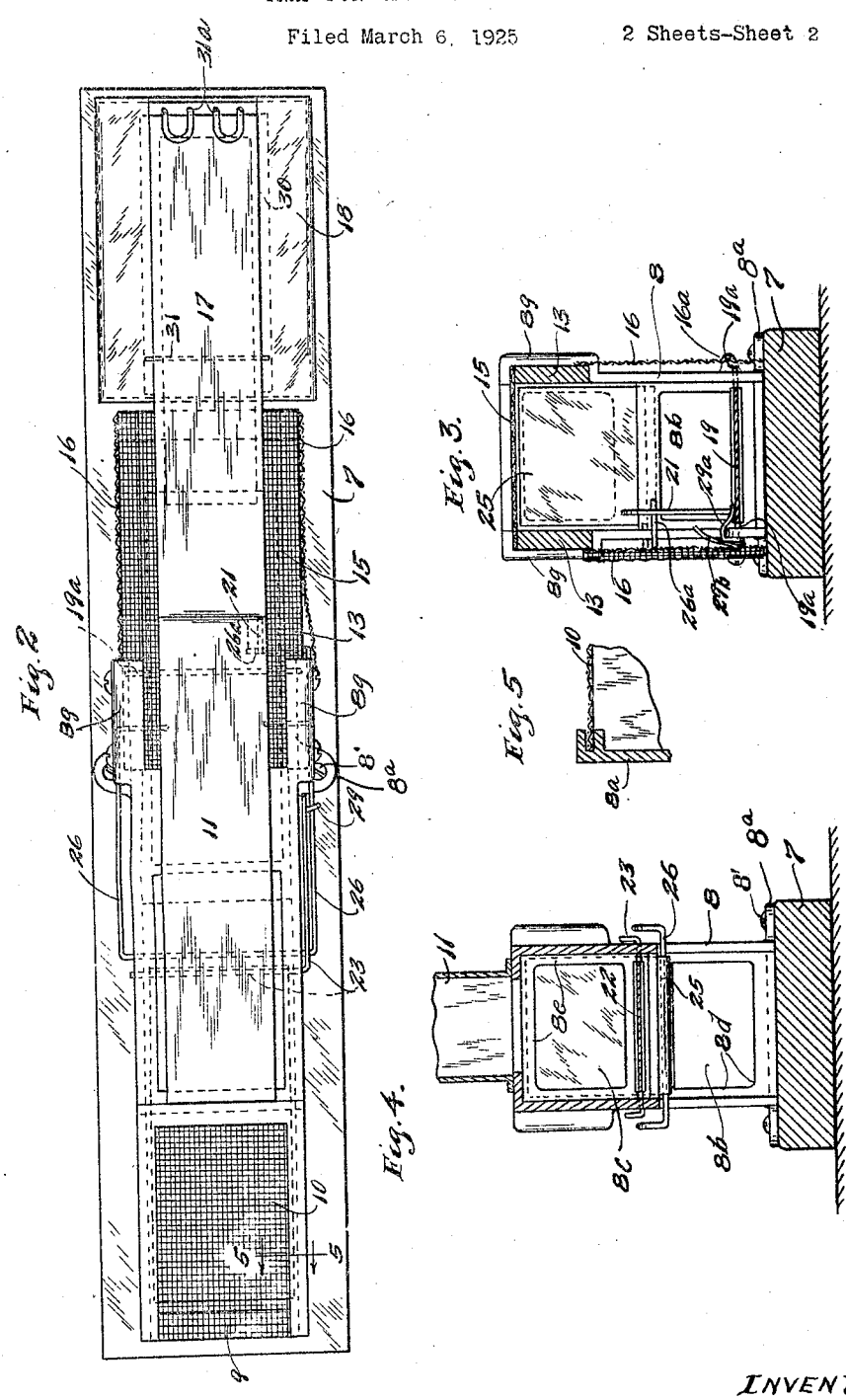

Patented Oct. 26, 1926.

1,604,491

UNITED STATES PATENT OFFICE.

JOSEPH W. SHUMATE, OF MINNEAPOLIS, MINNESOTA.

TRAP FOR MICE AND RATS.

Application filed March 6, 1925. Serial No. 13,447.

This invention relates to an animal trap, and while the trap may be made for trapping various animals, it particularly is designed for use as a rat and mouse trap.

It is an object of this invention to provide a simple and efficient trap which will operate with great certainty to trap the animals and to dispose of the same in a receptacle, preferably containing liquid, which trap will be reset by the animal after the animal is trapped and locked in position to prevent escape of the animal.

It is a further object of the invention to provide such a trap having a passageway with an entrance opening for the animal, a second passageway having an entrance opening for the animal and a door normally in position to close the last mentioned opening but movable by the animal after the same has passed through the first mentioned entrance opening to close said first mentioned opening, and means operated by the animal after he has passed into the second passageway to reset said door in normal position and lock the same against movement.

These and other objects and advantages of the invention will be fully set forth in the following description made in connection with the accompanying drawings in which like reference characters refer to the same parts throughout the different views, and in which, Fig. 1 is a view for the most part in side elevation of the trap, certain parts being broken away and other parts shown in vertical section;

Fig. 2 is a top plan view of the trap;

Fig. 3 is a vertical section taken on the line 3—3 of Fig. 1, as indicated by the arrows;

Fig. 4 is a vertical section taken on the line 4—4 of Fig. 1, as indicated by the arrows;

Fig. 5 is a vertical section taken on the line 5—5 of Fig. 2, as indicated by the arrows;

Fig. 6 is a partial view showing a sliding connection used; and

Fig. 7 is a vertical section taken on the line 6—6 of Fig. 6, as indicated by the arrows, Figs. 6 and 7 being shown on an enlarged scale.

Referring to the drawings, the device comprises a base member or plate 7 which may be made of wood or other suitable material and which has anchored thereto a member 8. While the member 8 may be made of sheet metal, the same preferably is made as a casting having lugs $8^a$ through which attaching screws $8'$ may pass to secure the same to base 7. The member 8 has substantially parallel side walls illustrated as disposed vertically. Said vertical walls have rear portions, the bottom edges of which are disposed above the base 7 and said walls are not connected so that there is an open space between the bottom sides thereof. At its front end the member 8 has a downwardly curving wall extending to the base 7, which wall is provided with an opening $8^b$. The member 8 also has a curved wall between the side walls thereof extending above the opening $8^b$ forming in effect a continuation of said first mentioned curved wall and in which is formed an opening $8^c$. The openings $8^b$ and $8^c$ are thus surrounded by curved flanges $8^d$ and $8^e$, respectively, the rearward concave surface of flange $8^e$ substantially alining with the forward convex surface of the flange $8^d$. Between the front ends of the portions of the member 8 is disposed a vertical member or panel 9 and while this panel may be made of various material, in the embodiment of the invention illustrated, the same is shown as made of wood. The front top portion of the member 8 is provided with a groove $8^f$, as shown in Figs. 1 and 4 adapted to receive a section of screen material 10. Immediately rearward of the portion receiving the screen 10 the member 8 is open at its top and an upwardly inclined conduit or runway 11, illustrated as of rectangular shape in cross section communicates therewith and is secured thereto, the conduit 11 preferably being made of sheet material, such as metal, and having a bottom member 12 disposed in its lower side which may be made of wood or other material affording a foot hold for the animal. The member 8 is closed at its top immediately in the rear of the conduit 11 and the side walls thereof are provided adjacent said top with outwardly extending portions $8^g$. The portions $8^g$ are adapted to receive side members 13 which may be made of any suitable desired material, but which are illustrated as made of wood, and held in place by screws $13^a$ extending through portions $8^g$. Said members 13 are connected at their rear ends by a vertically extending member or panel 14 extending therebetween and downward to the base 7. A section of screen material 15 is disposed over the members 13 and under the inwardly turned upper edges of the portions 8ᵍ, said screen, beyond the portions 8ᵍ, being secured to the members 13. Vertical screen walls 16 are secured to the outer sides of each of the members 13 adjacent their lower edge and to the side edges of member 14 and extend forwardly from the member 14 to the rear edges of the side walls of member 8, the rear edges of the screens 16 being spaced outwardly a short distance from the side walls of member 8, as shown in Fig. 3. The lower front corners of screens 16 are fastened by headed screws 16ᵃ screwed into the side walls of member 8 or into small bosses projecting therefrom. The upwardly extending inclined conduit 11 has a horizontal continuation 17 secured thereto, the lower rear edges of which are provided with inwardly extending grooves adapted to receive inwardly extending guide flanges 18ᵃ extending along the sides of an open top receptacle 18, said receptacle being shown as rectangular in cross section and as of sufficient height to rest upon the front of base 7.

The member 8 has a trip plate 19 disposed between its side walls rearward of the opening 8ᵇ which is pivoted on trunnions 19ᵃ in the side walls of member 8. The rear end of plate 19 terminates adjacent a plate 20 bent into right angle shape to form an attaching flange and secured to the base 7, the upwardly projecting portion of said plate 20 preferably being provided with teeth or points (not shown). The plate 19 carries at one side just rearwardly of the rear edge of one side wall of member 8 an upstanding plate 21 having a notch cut in its rear edge adjacent its top to form a latch. The front portions of the side walls of member 8 have pivoted therebetween a plate 22, which plate is secured at its rear end to a pivot member 23 extending through portions and having one of its ends bent rearwardly to form an arm 23ᵃ extending close to the outside surface of one side wall of member 8. The end of arm 23ᵃ is reversely bent, as shown at 23ᵇ, and said arm 23ᵃ and reversely bent portion 23ᵇ are embraced by a small clip 24 formed of sheet material and having an aperture 24ᵃ formed therein between arm 23ᵃ and its bent portion 23ᵇ for a purpose to be later described. Small pins or brads 22ᵃ are secured in the front portion of panel 9 beneath the plate 22 and form the lower stop therefor. A plate 25 formed on the same curve as the flanges 8ᶜ and 8ᵈ is provided adapted to be disposed at the rear side of the flange 8ᶜ and the front side of flange 8ᵈ and said plate is secured at its lower edge to the bight portion of a U-shaped member or bail 26, the arms of which extend along side of member 8 and are pivoted thereto by trunnions 27 secured to the arms of bail 26 and journaled in the side walls of member 8. One of the sides or arms of the bail 26 extends forwardly beyond its trunnion 27 between one of the screens 16 and the side of casing 8 and has its end bent inwardly substantially at right angles, as shown at 26ᵃ and adapted to be engaged both with the notch in the plate 21 and the top of said plate. Said arm 26ᵃ has a clip 28 secured thereto having an aperture therein in which is pivoted one end of a link 29, the upper end of which is pivoted in aperture 24ᵃ in clip 24. One of the screws 16ᵃ has disposed thereabout the central coil of a spring 29ᵇ, one arm of which engages the front edge of the side wall of the member 8 and the other arm 29ᵃ of which extends inwardly and bears on the top of plate 19 at one side thereof. It will be seen that the rear portions of the side wall of member 8, together with plate 19, form one passageway which has an entrance opening formed by the opening 8ᵇ and it will be seen that the forward side wall portions together with plate 22 form another passage and this passage has an entrance opening formed by the opening 8ᶜ. The conduit 17 has an open bottom above the receptacle 18 and the plate 30 is secured to a trunnion member 31 journaled in the side walls of conduit 17 so that the forward portion of the plate 30 will swing downwardly into receptacle 18. The rear end of the conduit 17 is open and spaced wires or bars 31ᵃ are secured to the top of the conduit and extend downwardly across the rear end thereof, these wires 31ᵃ being shown as formed by a pair of U-shaped members, the bight portions of which are bent at right angles and secured to the top of conduit 17.

In operation, the trap will be disposed, as shown in Fig. 1, and the receptacle 18, which is slidable in and out of position, will be partially filled with water, as shown in said figure, this water preferably being cold or iced. The bait will be disposed on plate 20 or forward thereof and some bait such as flour, or similar material, may be scattered on the plate 19 and on the base 7. The mouse, rat, or other animal, attracted by the bait, will pass through opening 8ᵇ and onto the front end of the plate 19. As the animal advances on plate 19 rearward of its trunnions 19ᵃ, said plate will swing downwardly and the plate 21 will swing forwardly, as indicated in the dotted line position thereof in Fig. 1 and the notch in said plate will move out of engagement with arm 26ᵃ on bail 26. This arm 26ᵃ is thus released and plate 25, which forms a swingable door, will drop downwardly automatically by gravity swinging about its trunnions 27 and this plate will fall to the dotted line position shown in Fig. 1, closing opening 8ᵇ and opening 8ᶜ. The animal hearing the drop of this plate at his rear will immediately turn and attempt to retrace his steps. The opening 8ᵇ, however, is closed and the animal seeing the light through the opening 8ᶜ quickly jumps therethrough onto plate 22. It will be noted that as the plate or door 25 swings downwardly its edges will overlap the flange 8ᵈ and said plate and flanges being curved and the surface thereof substantially in contact, it would be very difficult or impossible for the animal to scratch open said plate or get his claws under the edge thereof to move the same. The animal will seldom, if ever, retrace his steps and go back to the door 25 and opening 8ᵇ. Should he do so, however, he will depress the portion of plate 19 adjacent opening 8ᵇ against the tension of spring 29ᵇ and its arm 29ᵃ. The plate 19 will, therefore be swung down and the plate 21 will swing under the arm 26ᵃ. Even if the animal should therefore go back to opening 8ᵇ and be able to get his claws underneath door 25 he could not raise the door on account of arm 26ᵃ and plate 21 acting as a locking means holding the door closed. The animal is facing the opening 8ᶜ and will, as stated, pass through the opening 8ᶜ. The animal usually passes at once through opening 8ᶜ upon hearing the door 25 drop behind him and his weight comes upon the plate 22. When the animal passes off of plate 19, spring 29ᵇ again depresses the front portion of said plate and moves plate 21 from under the arm 26ᵃ. The plate 22 is depressed when the animal gets thereon, as shown by the lower dotted line position in Fig. 1 and as it swings to its lower position it moves upwardly the arm 23ᵃ which, in turn, through link 29, swings the bail 26 and door 25 upwardly to the normal position, again closing opening 8ᶜ. As the door 25 and bail 26 swing to normal position, the arm 26ᵃ again engages in the notch in plate 21. The door 25 is now locked in position and even if the animal could get his claws under the edge thereof around flange 8ᵉ, which is practically impossible, he could not open the door since it is securely held by the latch plate 21. The animal is thus trapped in the passageway between side portions of the member 8. In practice, the animal usually makes an attempt to open door 25 after he gets into the second passage and on plate 22. The present trap is an improvement upon that disclosed and claimed in applicant's co-pending application S. N. 704,634, filed April 7, 1924. It will be noted that if the animal is working on the door 25 attempting to open the same when in position on plate 22 that he will be facing toward the runway 11. In applicant's prior application, the structure was such that if the animal was working on the door he would be facing away from the runway leading upwardly and would have to turn around in order to face upwardly in the runway or see any light therein. In the present structure, as stated, the animal is facing directly up the runway 11 and will see the light at the upper end of conduits 11 and 17 and will eventually run up the conduit 11 on the floor member 12 and plate 30, from which it will be precipitated into the receptacle 18. The animals usually, in the present trap, pass upwardly in the runway 11 very soon after getting on the plate 22.

The present trap is much simpler in construction than the device in applicant's previous application and is provided with means more certainly insuring that the animal cannot escape after entering the passageway between the side walls of member 8.

The link 29 can be adjusted relatively to arm 23ᵃ by moving the clip 24 on said arm. The bent portion 23ᵇ is somewhat resilient and the clip 24 is thus frictionally held in its adjusted position on said arm.

From the above description it is seen that applicant has provided a very simple and efficient trap. The parts are comparatively easily and inexpensively made and of material which cannot be gnawed or destroyed by the animal so as to effect a means of escape. The rats or other animals go forward into the trap and are not seen afterwards by other companion rats or animals. The other companion rats or animals therefore do not become alarmed and suspicious of the trap but are rather inclined to follow the rats going into the trap. The trap has been amply demonstrated in actual practice and found to be very successful and efficient.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. An animal trap comprising a passage having an entrance opening for the animal at one end, a passage adjacent said passage having an entrance opening communicating with said first mentioned passage, a movable means normally in position to close said second mentioned opening and means operated by the animal after entering said first mentioned opening to permit operation of said movable means to close said first mentioned opening and open said second mentioned opening, and means movable by the animal upon entering said second mentioned opening for again moving said movable means to normal position and locking the same in position against movement by the animal whereby said second mentioned entrance opening is closed and locked and the animal trapped in said second mentioned passageway.

2. An animal trap comprising a passage having an entrance opening for the animal at one end, a passage adjacent said passage having an entrance opening communicating with said first mentioned passage, a swinging door normally in position to close said second mentioned opening, adapted to automatically move to close said first mentioned entrance opening and open said second mentioned entrance opening, a pivot plate forming the bottom of said first mentioned passage, means operated by said pivot plate to permit actuation of said door and to lock said door in position closing said first mentioned entrance when the animal is on said plate, and means for moving said pivot plate when the animal leaves the same to raise said door and lock the same in its upper position.

3. An animal trap comprising a passage having an entrance opening for the animal at one end, a passage adjacent said passage having an entrance opening communicating with said first mentioned passage, a swinging door normally in position to close said second mentioned opening and means operated by the animal after entering said first mentioned opening to permit actuation of said door to close said first mentioned opening and open said second mentioned opening, means adapted to be operated by the animal upon entering said second mentioned opening to again move said door to normal position, and locking means for holding said door in such normal position against movement by the animal.

4. The structure set forth in claim 3, said second mentioned entrance opening being substantially above said first mentioned entrance opening and said openings being respectively surrounded by flanges curved on the same arc, which arc has its center at the axis about which said door swings, said door also being curved on the same arc to fit closely against said flanges, said door extending over said flanges.

5. The structure set forth in claim 3, said second mentioned entrance opening being disposed above said first mentioned entrance opening and said second mentioned passage being elevated from and extending in the opposite direction to said first mentioned passage, a runway extending upwardly in an inclined direction from said second mentioned passage adjacent the entrance opening thereof and the second mentioned passage having an openwork section in its top beyond said runway.

6. An animal trap comprising a passage having an entrance opening for the animal at one end, a trip plate forming the bottom of said passage, a passage adjacent said passage having an entrance opening communicating with said first mentioned passage, an automatically actuated door normally in position to close said second mentioned opening, said trip plate operating to permit actuation of said door to close said first mentioned opening and open said second mentioned opening, a plate forming the bottom of said second passage and adapted to be operated by the animal to move said door to normal position and lock the same in normal position.

7. An animal trap comprising a passage having an entrance opening for the animal at one end, a pivoted trip plate forming the bottom of said passage, a passage adjacent said passage having an entrance opening communicating with said first mentioned passage, an automatically actuated door normally in position to close said second mentioned opening, said trip plate operating to permit actuation of said door to close said first mentioned opening and open said second mentioned opening, a plate forming the bottom of said second passage and adapted to be operated by the animal to move said door to normal position, and a locking means carried by said first mentioned trip plate adapted to engage a member carried by said door and lock said door in normal position.

8. An animal trap comprising a member having spaced vertical side walls forming a passage, an entrance opening for the animal at one end of said passage, said walls also forming another passage elevated from said first mentioned passage, said last mentioned passage having an entrance opening communicating with said first mentioned passage, a swinging door normally closing said second mentioned opening and having arms secured thereto extending along the said side walls and having their ends pivoted therein, said door swinging about said pivoted ends, a pivoted plate forming the bottom of said first mentioned passage having a latching means thereon, a member extending from one of said arms engaging said latching means to hold said door in normal position, said pivoted plate being adapted to be operated by the animal to release said latching means and permit said door to move to close said first mentioned opening and to open said second mentioned opening, a pivoted plate forming the bottom of said second mentioned passage having an arm secured thereto and extending along one of said side walls, a link having one end pivotally connected to and slidable on said last mentioned arm and having its other end pivotally connected to one of said first mentioned arms whereby said last mentioned plate, when trod upon by the animal after passing through said second mentioned opening will swing said door to normal position and the same will be engaged by said latching means to hold it in normal position against movement by the trapped animal.

9. An animal trap comprising a passage having an entrance opening for the animal at one end, a trip plate forming the bottom of said passage, a passage adjacent said passage having an entrance opening communicating with said first mentioned passage, an automatically actuated door normally in position to close said second mentioned opening, said trip plate operating to permit actuation of said door to close said first mentioned opening and close said second mentioned opening, a plate forming the bottom of said second passage and adapted to be operated by the animal to move said door to normal position, a latching means adapted to engage a member carried by said door to hold the same in normal position, and an articulated connection between said last mentioned plate and door to move the same to normal position and into engaging position with said latch.

10. An animal trap comprising a passage having an entrance opening for the animal at one end, a passage adjacent said passage having an entrance opening communicating with said first mentioned passage, a swinging door normally in position to close said second mentioned opening, a plate pivoted intermediate its ends forming the bottom of said first mentioned passage, a latch carried by said plate, means connected to said door adapted to engage said latch and hold said door in normal position, said pivot plate being disposed so that said latch normally swings upwardly, and a resilient means engaging the top of said plate on the same side of the pivot as said latch to swing said latch into engaging position when said plate is free.

11. An animal trap comprising a passage having an entrance opening for the animal at one end, a pivoted plate forming the bottom of said passage, a passage adjacent said passage having an entrance opening communicating with said first mentioned passage, a door normally in position to close said second mentioned opening but releasable by said trip plate to move to position to close said first mentioned opening and open said second mentioned opening, said trip plate being adapted, when an animal is on the end thereof adjacent said first mentioned entrance opening, to lock said door against movement, and a spring engaging said trip plate on the side of its pivot remote from said first mentioned entrance opening adapted to move said trip plate to release said door so that the latter can again be moved to normal position.

12. The structure set forth in claim 3, and a runway leading upwardly in an inclined direction from said second mentioned passage adjacent the end of said passage in which said second mentioned entrance opening is disposed whereby when the animal faces the swinging door closing the second mentioned entrance opening he will face said runway.

13. An animal trap comprising a passage having an entrance opening for the animal at one end, a passage adjacent said passage having an entrance opening communicating with said first mentioned passage, a swinging door normally in position to close said second mentioned opening but movable to close said first mentioned entrance opening and open said second mentioned entrance opening, a pivoted plate forming the bottom of said first mentioned passage, means carried by said plate adapted to engage a member carried by said swinging door, said member and means being engaged by movement of said plate when the animal retraces his steps and is on said plate adjacent said first mentioned entrance opening after the door has moved to close said first mentioned entrance opening, and means for moving said pivoted plate after the animal leaves the same to disengage said means on the plate and said member attached to said swinging door.

14. An animal trap comprising a member having a wall therein of slightly curved shape having openings therethrough forming, respectively, entrance openings into a pair of passages extending respectively at each side of said wall, a door movable along said wall normally in position to close one of said passages, a trip plate in the other passage adapted to be operated by an animal treading thereon to release said door, said door being adapted automatically to move to position to close said other passage and open said first mentioned passage, and means for re-setting said door again to close said first mentioned passage after the animal passes into said first mentioned passageway.

In testimony whereof, I affix my signature.

JOSEPH W. SHUMATE.